United States Patent [19]
Blumel et al.

[11] Patent Number: 5,393,510
[45] Date of Patent: Feb. 28, 1995

[54] HIGH SOLIDS CONTENT TITANIUM DIOXIDE SUSPENSION

[75] Inventors: Siegfried Blumel, Ratingen; Achim Hartmann, Pulheim; Hans Thumm, Leverkusen; Hans-Hermann Luginsland, Leverkusen; Franz Rosendahl, Leverkusen, all of Germany

[73] Assignee: Rheox, Inc., Hightstown, N.J.

[21] Appl. No.: 91,342

[22] Filed: Jul. 12, 1993

[30] Foreign Application Priority Data

Jul. 22, 1992 [DE] Germany .............................. 4224150

[51] Int. Cl.$^6$ .......................... C01G 23/04; C09C 1/36
[52] U.S. Cl. ..................................... 423/610; 106/436
[58] Field of Search ............... 423/610, 611, 612, 613, 423/614; 106/436, 437, 447, 448

[56] References Cited

U.S. PATENT DOCUMENTS

| | | | |
|---|---|---|---|
| 3,758,322 | 9/1973 | Roberts, Jr. et al. | 106/448 |
| 4,225,564 | 9/1980 | Tolley | 423/82 |
| 4,280,849 | 7/1981 | Howard et al. | 106/436 |
| 4,288,254 | 9/1981 | Gladu | 106/436 |
| 4,355,015 | 10/1982 | Heckel et al. | 423/612 |
| 4,978,396 | 12/1990 | Story | 106/436 |

FOREIGN PATENT DOCUMENTS

| | | | |
|---|---|---|---|
| 780512 | 3/1968 | Canada | 106/447 |
| 590323 | 1/1978 | U.S.S.R. | 106/436 |

*Primary Examiner*—Steven Bos
*Attorney, Agent, or Firm*—Michael J. Cronin

[57] ABSTRACT

A finely divided chloride process titanium dioxide prepared without the use of a dispersing agent. The slurry is dewatered via filtration, and the resulting filter cake is made flowable with an anionic dispersing agent. In order to attain a filter cake with very high solids content, the slurry should contain no, or only very few, multivalent anions. The conditions regarding the content of multivalent anions of the slurry are achieved by selection of suitable dechlorinating agents, especially hydrogen peroxide. The filter cake is thixotropic and is made flowable by the fact that it is put into the "diluted" dispersing agent, especially into a part of the titanium dioxide suspension to which the required quantity of dispersing agent has previously been added. Titanium dioxide suspensions with solids content of approximately 78% are thereby obtained and are of particular use in the paper industry.

4 Claims, No Drawings

HIGH SOLIDS CONTENT TITANIUM DIOXIDE SUSPENSION

This application is related to a patent application filed contemporaneously with this application in the name of Kronos, Inc. for CONTROL PROCESS FOR SOLIDS CONTENT OF TITANIUM DIOXIDE FILTER CAKE.

BACKGROUND OF THE INVENTION

The present invention is concerned with a titanium dioxide suspension with a high solids content and a process for the preparation thereof. More specifically, the present invention relates to a finely divided dryly precipitated titanium dioxide which is first converted into an aqueous slurry containing precipitated titanium dioxide in unflocculated condition; the slurry is then dechlorinated and filtered, and the resultant filter cake is rendered flowable with the aid of a dispersing agent. The product is especially useful in paper manufacture where titanium dioxide suspension is particularly useful as a raw material to meet the requirements of manufacturers for a liquid system to be used at their plant facilities.

The preparation of finely divided titanium dioxide through reaction of titanium tetrachloride in the vapor phase with an oxygen-containing gas, the so-called "chloride titanium dioxide process", has become increasingly important in producing titanim dioxide for world markets. There today exists the requirement to transport large quantities of titanium dioxide in the form of a highly stable aqueous suspension.

In a representative prior art process for preparation of a titanium dioxide suspension, as described for example in U.S. Pat. No. 3,536,510, a dry, ground post-treated titanium dioxide pigment is dispersed in water with the use of a dispersing agent. In other prior art processes, the solids content of the dispersion is increased through various processes of reducing the water content ("dewatering"). For example as described in U.S. Pat. No. 3,758,322 a flocculating agent is added to an approximately 20% (weight) titanium dioxide pigment slurry, the flocculated slurry is filtered, and a filter cake with a titanium dioxide solids content of 60 to 80% (weight) is obtained. This filter cake is again rendered flowable via stirring and the addition of a dispersing agent. Before being rendered flowable, however, the filter cake must be freed of the flocculating agent through expensive washing steps.

In U.S. Pat. No. 4,280,849, an expensive and complicated two-stage filtration process is described. U.S. Pat. No. 4,978,396 describes a process in which a titanium dioxide slurry prepared in an unflocculated condition with the aid of a first dispersing agent is dewatered via pressure filtration. The filter cake is made then flowable by the addition of a second dispersing agent. Because of the first dispersing agent, there is significant filtration loss in the filtration. A considerably cloudy filtrate is obtained which requires complicated and costly processing.

OBJECTS AND SUMMARY OF THE INVENTION

An object of the present invention is to provide a process, and a product made thereby, in which, in an economical and simple way, a titanium dioxide suspension can be prepared with a high solids content without having to start with dry post-treated material and without the occurrence of the known problems in the dewatering of the slurried titanium dioxide.

The foregoing object is achieved by a process in which the slurry is subjected to filtration without the addition of a dispersing agent to form a thixotropic filter cake. This cake is placed into suspension at a high solids content with the required dispersing agent contained in the starting suspension.

The present invention is based on the discovery that a higher solids content in a titanium dioxide suspension can be achieved, without first preparing a dried "pigment". By use of this invention a filter cake is collected in a thixotropic condition. The ion content in the starting slurry is important for obtaining a filter cake with a high solids content. It is normally a matter of minimizing multivalent ions, which are introduced by the dechlorination step. The further treatment of the filter cake to a suspension with high solids content is achieved in that the thixotropic filter cake is worked into a "receiver" suspension, which already contains the required dispersion agent in excess. The dispersing agent used can also consist of a mixture of one of more such agents. By use of the process according to the present invention, titanium dioxide suspensions with a solids content of over 75% (wt.) titanium dioxide can be successfully obtained at favorable cost in a reliable way. Such a titanium dioxide suspension shows outstanding industrial processing properties. It is particularly stable and substantially transport- and storage-stable for periods of time.

The solids content and the consistency of the filter cake are shaped by the control of the content and amount of multivalent anions in the slurry. The titanium dioxide slurry admitted to filtration should be prepared under such conditions that flocculation of the slurried titanium dioxide is avoided. To this end, on one hand, the pH normally should be below 4, but also the slurry may only contain, up to a maximum value, substances which cause the slurried titanium dioxide to coagulate. Control of the amount of multivalent anions is particularly important.

The dechlorination of the slurry should be given special attention. As a general rule, it cannot be avoided that with a titanium dioxide made by the chloride process, chlorine will be contained in the slurry. Chlorine and the reducible chlorine compounds, formed from it, especially hypochlorite compounds, are separated by means of "anti-chlorine agents." It is an object that the least possible multivalent anions come into the slurry or are formed in it. Removal of chlorine from the dry precipitate has not been successful (see German Patent No. 762 723 C and German Patent No. 18 06 122 A, neither of which has a United States counterpart). Such substances may be used which, in the formation of slurry, do not lead to titanium dioxide agglomerates, which cannot again be readily distributed, or come into the slurry in the form of multivalent anions.

An especially suitable reducing agent is hydrogen peroxide. Hydroxylammonium chloride has also been determined to be appropriate. With the use of hydrogen peroxide as the reducing agent, hydrochloric acid and oxygen are formed in the slurry with, however, no multivalent anions. These substances do not disturb the filtration, even when present in very large quantity.

If only small quantities of chlorine are in the slurry, dechlorination can also be carried out with very small amounts of substances forming multivalent anions such as, for example, sodium hydrogen sulfite. With use of this reducing agent, sodium sulfate forms in the slurry in addition to chloride. It has been shown, for example, that a multivalent anion content in the slurry to be filtered of up to $3 \times 10^{-3}$ mol/liter permits the formation of a desired filter cake with high solids content. It can also be possible to use a combination of hydrogen peroxide and sodium hydrogen sulfite as the reducing agent. Hydrogen peroxide is added to the slurry before the sodium hydrogen sulfite. The reducing agents are generally added in the form of aqueous solutions.

Pressure filtration with a filter press can be used to achieve a suspension with high solids content. A membrane filter press is especially appropriate. The pressure to be applied depends on the solids content of the slurry, the thickness of the filter cake to be formed and the solids content of the filter cake, which, for its part, is determined by the solids content of the desired titanium dioxide suspension.

The dispersing of the titanium dioxide thixotropic filter cake is an additional essential step in the process according to the present invention. If, for example, the dispersing agent is added directly into the liquefied filter cake produced, a rigid unstirrable material arises almost abruptly and can only via very long mastication be converted into a flowable suspension. It is important that the filter cake be stirred into an appropriately "diluted" dispersing agent. However, it would be disadvantageous if the solids content of the suspension were to decline substantially through the conversion of the filter cake into a flowable suspension. Therefore, according to the present invention, it is especially advantageous to concentrate a part of the titanium dioxide suspension previously prepared with a dispersing agent and to add, with stirring, the thixotropic filter cake into this "receiver suspension". In such a simple manner, highly concentrated titanium dioxide suspensions can be successfully prepared. The miscibility of the dispersing agent with the filter cake is considerably improved via the produced titanium dioxide suspension and the process can easily be made continuous.

Preferably, the dispersing agent is provided in a quantity of 0.1 to 5% (wt.) based on the titanium dioxide content of the filter cake. As the dispersing agent or dispersing agent mixture, substances from the groups alkali polyphosphates, aliphatic carboxylic acids, their alkali salts and acid salts, polyacrylic acids and their alkali salts, polyhydroxy alcohols and aminoalcohols are usable. Especially preferred is a mixture of one or more alkali polyphosphates and/or polyacrylates and one or several alkanolamines.

For the preparation of the titanium dioxide suspension the flowable suspension can be ground. For this purpose, conventional equipment suitable for wet grinding, especially sand mills and pearl mills, can be used.

DETAILED DESCRIPTION OF THE INVENTION

These and further objects, advantages and features of the present invention will become readily apparent from the following detailed description thereof in the form of the below-described specific examples.

The experiments started with an aqueous chlorine-containing titanium dioxide slurry as it was obtained in the chloride process for manufacturing titanium dioxide. The slurry was dechlorinated after the separation of coarse constituents through wet screening with a strainer with mesh size of 0.16 mm. The slurry contained 465 g/l titanium dioxide; the dechlorination requirement, calculated as equivalent concentration C ($\frac{1}{2}$ Cl$_2$), amounted to $2 \times 10^{-3}$ mol/liter. A 10% solution of sodium hydrogen sulfite was added for the dechlorination, and the pH was 2.8. The content of multivalent anions in the slurry was under $3 \times 10^{-3}$ mol/liter.

EXAMPLE 1

275 kg of the above slurry were filtered with a membrane filterpress with 4.5 m$^2$ filtering area for 25 minutes with a final filtration pressure of 4.2 bars. After that the resultant filter cake was post-pressed for 15 minutes at 6 bars. 121.6 kg of thixotropic filter cake with 77.5% dry substance were obtained.

The filter cake was transferred into a receiving vessel, in which were 150 kg of a previously prepared flowable titanium dioxide suspension. This "receiver suspension" had a solids content of 77.3% titanium dioxide and additionally contained 0.7% polyacrylate dispersing agent. No problems occurred with mixing; the filter cake was especially easy to disperse. The suspension so prepared was extremely flowable.

The suspension was additionally treated with 0.2% 2-amino-2-methylpropanol and diluted with water to 73% solids content and finally ground in a sand mill with an output of 6.2 t/m$^3$h. Before grinding 0.1% of an antifoam agent was added. The suspension was determined to be storage-stable, to have a Brookfield viscosity of 400 mPa.s (100 rpm) and when tested was determined to be very suitable for use in the field of paper coatings.

EXAMPLE 2

The titanium dioxide slurry for this experiment is similar to that used in Experiment 1 although drawn from another production run. As a result of preparation conditions, a significantly greater portion of chlorine was in the slurry. The value was 0.40 g chlorine/liter (approximately five times that in previously described Example 1) which resulted in correspondingly greater stoichiometric quantities of sodium hydrogen sulfite having to be added. The other parameters in Example 1 were not changed. 144.8 kg of a puncture-proof filter cake with 65% dry material were obtained which were determined to be effective by standard testing.

EXAMPLE 3

Titanium dioxide, as in above Example 2, was again used, so that substantial chlorine (0.40 g/l) was in the slurry. Instead of the sodium hydrogen sulfite, a corresponding stoichiometric quantity of hydrogen peroxide was used as a 30% solution 122.4 kg thixotropic filter cake with 77% dry substance was obtained. Further working of the filter cake took place as described in above Example 1. The sand-milled suspension was tested and found to be storage-stable and well suited for use in the paper coating field.

EXAMPLE 4

The starting material was, as in above Examples 2 and 3, relatively strong in chlorine content. The reduction of chlorine was accomplished with a combination of hydrogen peroxide and sodium hydrogen sulfite. The relative quantities were such that the reduction of the chlorine was undertaken equally by both substances. As a result, 121.8 kg of a thixotropic filter cake with 77.3% dry substance was obtained. After dispersing and sandmilling, the filter cake was determined to be excellently flowable and exhibited a viscosity of 1200 mPa.s.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is as follows:

1. A process for preparation of a titanium dioxide aqueous suspension with a titanium dioxide solids content of greater than about 75% by weight of such suspension, comprising the steps of
    (a) dispersing titanium dioxide into an aqueous slurry,
    (b) dechlorinating the slurry with an and-chloride agent selected from the group consisting of hydrogen peroxide, sodium hydrogen sulfite and a mixture thereof,
    (c) subjecting the slurry obtained after step (b) to filtration without addition of a dispersing agent to form a thixotropic filter cake and,
    (d) dispersing said filter cake into a titanium dioxide suspension which suspension contains a dispersing agent in a quantity of at least 0.1% to 5% by weight based on the titanium dioxide content of said filter cake selected from the group consisting of an alkali polyphosphate, an aliphatic carboxylic acid and alkali salts thereof, polyacrylic acid and alkali salts thereof, a polyhydroxy alcohol, an amino alcohol and a mixture thereof, thus rendering the filter cake flowable, thereby forming said titanium dioxide aqueous suspension.

2. The process according to claim 1, wherein after step (b), the slurry has a maximum content of multivalent anions of $3 \times 10^{-3}$ mol/l.

3. The process according to claim 1, wherein the filtration step is carried out with a membrane pressure filter press.

4. The process according to claim 3, wherein the membrane pressure filter press is loaded with a pressure of between about 4 to 6 bars.

* * * * *

UNITED STATES PATENT AND TRADEMARK OFFICE
CERTIFICATE OF CORRECTION

PATENT NO. : 5,393,510
DATED : February 28, 1995
INVENTOR(S) : Blumel et al.

It is certified that error appears in the above-indentified patent and that said Letters Patent is hereby corrected as shown below:

Column 1, Line 54, after "solution" insert a period.

Column 5, Line 15, delete "and-chloride" and insert --anti-chloride--.

Signed and Sealed this

Eighteenth Day of July, 1995

Attest:

BRUCE LEHMAN

Attesting Officer

Commissioner of Patents and Trademarks